United States Patent [19]

Nunn

[11] 4,195,847
[45] Apr. 1, 1980

[54] CLEANING DEVICE FOR PHONOGRAPH RECORDS

[76] Inventor: Bernard J. Nunn, Apt. 2, 303 Cambridge St., Ottawa, Ontario K1R7B3, Canada

[21] Appl. No.: 943,699

[22] Filed: Aug. 17, 1978

[51] Int. Cl.² ............................................. G11B 3/58
[52] U.S. Cl. .................................. 274/47; 274/23 R
[58] Field of Search ............................... 274/47, 23 R

[56] References Cited

U.S. PATENT DOCUMENTS

| | | | |
|---|---|---|---|
| 3,203,701 | 8/1965 | Rosenthal | 274/47 |
| 3,486,757 | 12/1969 | Loescher | 274/47 |
| 3,836,155 | 9/1974 | Joannou | 274/23 R |
| 4,095,802 | 6/1978 | Horian et al. | 274/47 |

FOREIGN PATENT DOCUMENTS

| | | | |
|---|---|---|---|
| 981405 | 1/1976 | Canada | 274/47 |
| 2053347 | 5/1972 | Fed. Rep. of Germany | 274/47 |
| 1240577 | 4/1960 | France | 274/47 |

*Primary Examiner*—John W. Shepperd
*Attorney, Agent, or Firm*—Zalkind & Shuster

[57] ABSTRACT

An automatic cleaning device for phonograph records comprising an elongate arm having a downwardly depending brush at one end and a counterweight at the other end; said arm being mounted on a vertical elongate elastic member at a point nearer said counterweight than said brush; said arm being frictionally engaged by said vertical elastic member, to permit free rotation of said arm in a horizontal arc, and free pivoting of said arm in a vertical direction.

7 Claims, 5 Drawing Figures

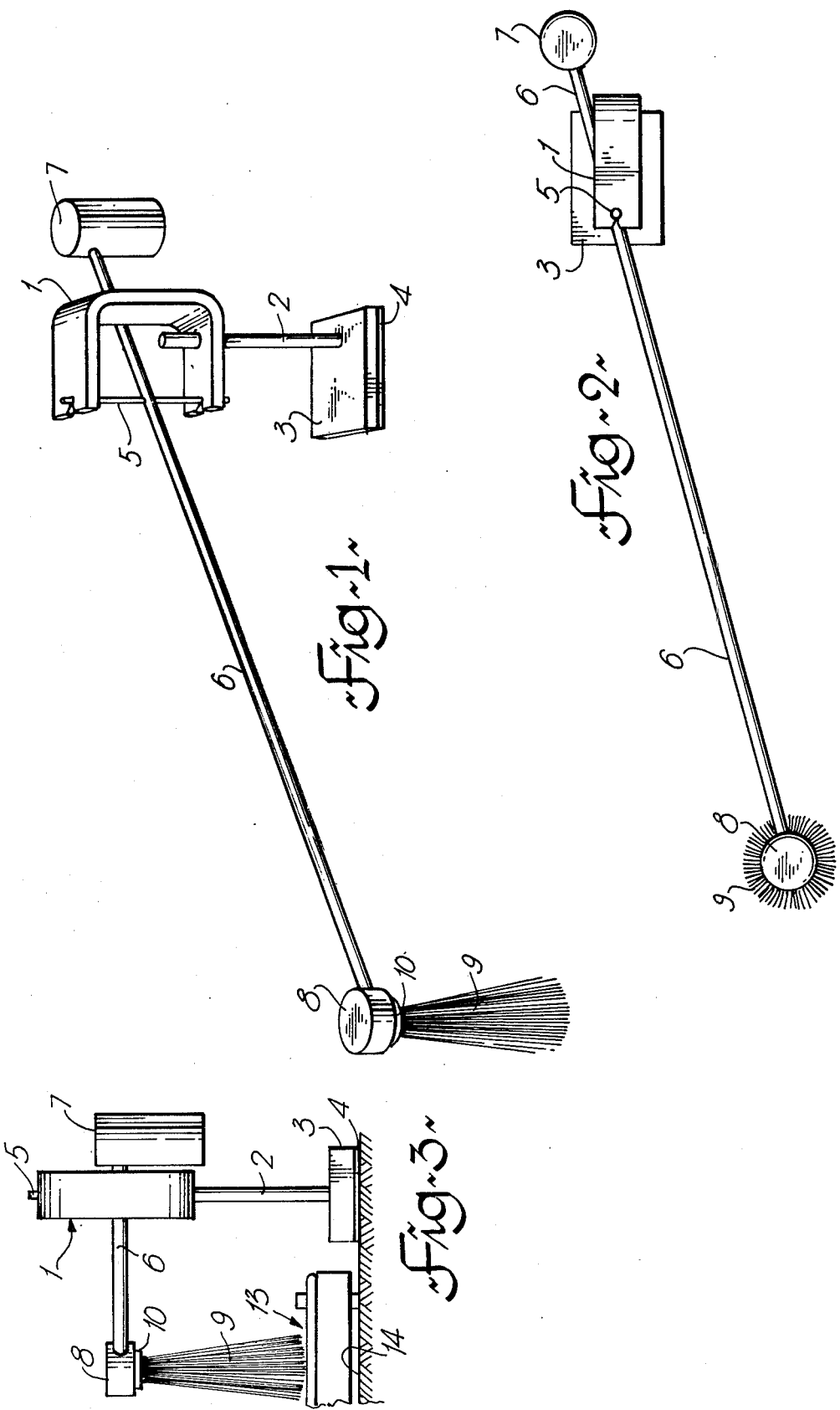

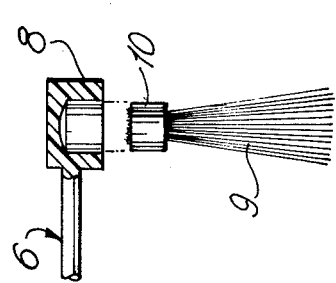
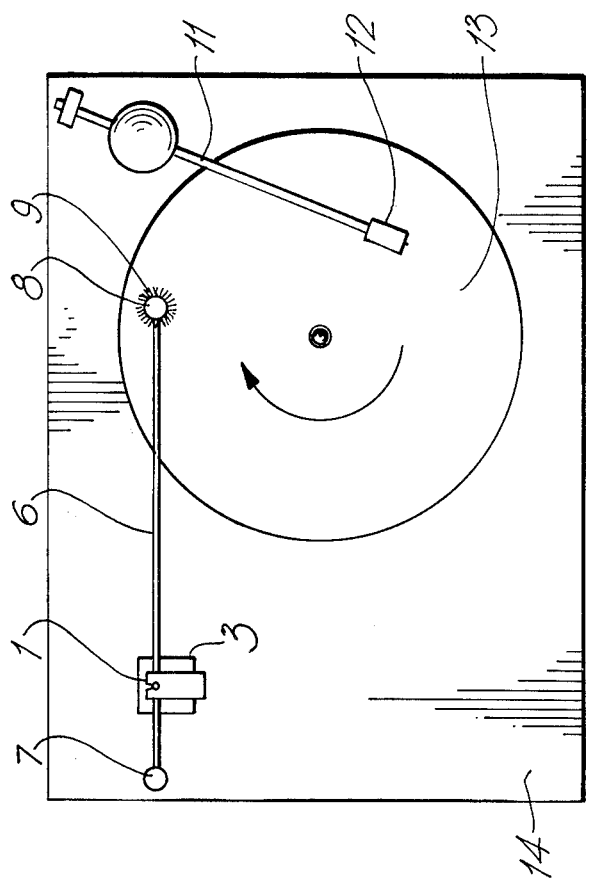

CLEANING DEVICE FOR PHONOGRAPH RECORDS

There are many known apparati adapted to collect dust from the surface of phonograph records. Some attach onto the tone arm itself, and some mount separately in a corner of the record player having an independent arm which tracks across the record as it turns concurrent with the tone arm tracking across the record, and there is another class of record cleaner which are hand held, and with which one dusts off the record before playing it.

There are however disadvantages and advantages to each presently existing device which the present invention described in this disclosure solves.

The hand-held type of record cleaner does a good job of removing dust from the surface of the record, but while the record is playing, dust can settle on the record, and interfere with the action of the stylus, thus defeating the purpose of the cleaning action.

The apparatus which attaches to the pick-up head of tone arm interferes with the sound reproduction of the stylus by introducing its own vibrations into the pick-up head.

Obviously the most effective device is one which tracks automatically across the record while it is playing (thus continually picking up dust before it gets to the needle), and which is mounted on its own free swinging arm, so that no interfering vibrations are introduced to the stylus.

Within this last class of devices described above, there are many existing models each with its own advantages and disadvantages. In the low price range, exist models utilizing a soft pad or bristly pad to pick up the dust. They however are not counterweighted and exert a weight of up to 10 grams on the turning record, thus slowing it down. Also, the bristles used are usually hard and make a loud objectionable scratching sound as the record turns. Also, these devices usually neither pick up the dust on the record, nor do they track across the surface of the record at the same rate as the stylus.

The more expensive models however utilize a soft, animal bristle, and are counterweighted, and pivot so that they actually pick up most of the dust on the record, and do not suffer from the points outlined above.

The present invention described herein utilizes the soft animal bristle and counterweight, but has three unique features which enable it to be produced at a low cost and in a variety of designs to appeal to various personal tastes. It is these unique features for which will be described herein.

A principal object of the invention is to provide an automatic cleaning device for phonograph records comprising: an elongate arm having a downwardly depending brush at one end and a counterweight at the other end; said arm being mounted on a vertical elongate elastic member at a point nearer said counterweight than said brush; said arm being frictionally engaged by said vertical elastic member, to permit free rotation of said arm in a horizontal arc, and free pivoting of said arm in a vertical direction.

Detailed reference will now be made to the accompanying drawings wherein like reference numerals will identify like parts:

FIG. 1 is a perspective view of the dust collector according to the invention;

FIG. 2 is a top plan of the dust collector of FIG. 1;

FIG. 3 is an end view of the dust collector illustrated in FIG. 1, also illustrating a portion of a phonograph record on a turn table;

FIG. 4 is a detail, partly in section of a removable bristle brush according to the invention; and FIG. 5 is a top plan showing one placement of a dust brush on a turn table.

Referring now in detail to the drawings, a post 2 is vertically mounted on a base member 3, which is designed to be removably affixed to the top surface of a record player 14 by a double adhesive backed foam piece 4. Post 2 frictionally engages a "D" shaped bracket member 1, having a hole in the bottom thereof, adapted frictionally to support itself on post 2, whereby member 1 may selectively be moved to a higher or lower position on post 2. The face of "D" shaped member 1 is closed by a rubber cord 5 which is affixed to the top and bottom arms of member 1, near the face thereof. Rubber cord 5 passes through an opening in an arm 6 of the dust brush, and frictionally engages said arm 6. Arm 6, however, may be selectively positioned higher or lower along the vertical length of cord 5. Because of the flexible nature of cord 5 arm 6 is free to swing in a horizontal arc around the axes of cord 5, and is also free to pivot vertically thereon. A counterweight 7 is affixed to the end of arm 6 nearest cord 5, and at the other end of arm 6 is a headpiece 8 from which an animal bristle brush 9 downwardly depends. Referring to FIG. 4 it will be seen that brush 9 includes a top collar 10, of rubber tubing or the like, which is adapted to be removably retained within headpiece 8, so that the bristle brush may be removed for cleaning, or replacement, as necessary.

Rubber cord 5 may be of any desired geometrical cross-section, adapted to be received in a corresponding hole in arm 6, so that cord 5 permits free pivoting of the brush arm not only from side to side, but also vertically.

The principal advantage of the rubber cord pivot support 5 is to achieve controlled tracking of the brush 9 across a phonograph record during use. It is also possible to incorporate a twist, or counter twist in cord 5 so that the user may selectively either speed up or retard the tracking of brush 9 across a record during play, and thus to coordinate the speed of travel of brush 9 from the periphery to the center of a record at the same speed as the tone arm.

While the attached drawing discloses a support pedestal including a base 3, a post 2, and a cord support member 1 in a particular shape, it will be appreciated that any number of cord support arrangements will be evident to those skilled in the art.

Brush 9 has been illustrated as being selectively removable from head 8, so that occassional cleaning may be accomplished. The animal bristles of brush 9, it will be seen, are in a discrete bundle, and serve to remove dust particles from the grooves of a record during play, to retain them in the stacked plate structure of the hairs, and to gradually collect and form a solid lint piece, for manual removal.

It will be further appreciated that the provision of flexible cord 5 will permit the user to raise arm 6 along the length thereof, to accommodate record players having turn tables which are higher or lower than the surrounding turn table surface.

The foregoing is by way of example only, and the invention should be limited only by the scope of the appended claims.

The embodiments of the invention in which an exclusive property or privilege is claimed are defined as follows:

1. In an automatic cleaning device for phonograph records, of the kind having a support arm with a brush at one end and a counterweight at the other and with a support member therebetween;

the improvement comprising a flexible vertical member of elastic material carrying said support arm and being carried between two spaced points on said support member, and means for securing said support arm to said flexible member; said flexible member being twistable and bendable to permit horizontal and vertical swinging of said support arm.

2. In an automatic cleaning device for phonograph records according to claim 1 said support member comprising a bracket member having horizontally extending bracket arms;

said vertical elastic member comprising a rubber cord means carried between said bracket arms;

said support arm being carried on said rubber cord means intermediate said bracket arms;

and said rubber cord means being substantially without initial tension so as to be readily flexible for permitting horizontal or vertical movement of said support arm.

3. In an automatic cleaning device for phonograph records according to claim 1, said support arm being frictionally secured to said vertical elastic member gripped in a hole provided in said support arm, whereby said support arm may be manually adjusted upwardly or downwardly along the length of said elastic member.

4. In an automatic cleaning device for phonograph records according to claim 1, including a brush comprising bristles secured in a collar of elastic material;

said support arm having a headpiece within which said collar may be frictionally retained so as to be carried by or removed from said support arm.

5. In an automatic cleaning device for phonograph records according to claim 1, said support member comprising a bracket member having horizontally extending bracket arms;

said vertical elastic member comprising a rubber cord means extending between said bracket arms.

6. In an automatic cleaning device for phonograph records according to claim 5, a support post for said bracket member secured to one of said bracket arms and means for fixing said post to a phonograph turntable, wherein said post passes through a holder in said bracket arm and is frictionally gripped therein so that said bracket member may be vertically and horizontally positioned on said support posts.

7. In an automatic cleaning device for phonograph records according to claim 5, said support arm having a frictional support engagement with said rubber cord means and being selectably positionable thereon.

* * * * *